Sept. 19, 1939.　　　　R. A. KLATT　　　　2,173,520
JUVENILE CAR
Filed March 31, 1938　　　2 Sheets-Sheet 1

INVENTOR
Rudolph A. Klatt
BY Popp & Popp
ATTORNEYS

Sept. 19, 1939.  R. A. KLATT  2,173,520
JUVENILE CAR
Filed March 31, 1938  2 Sheets-Sheet 2
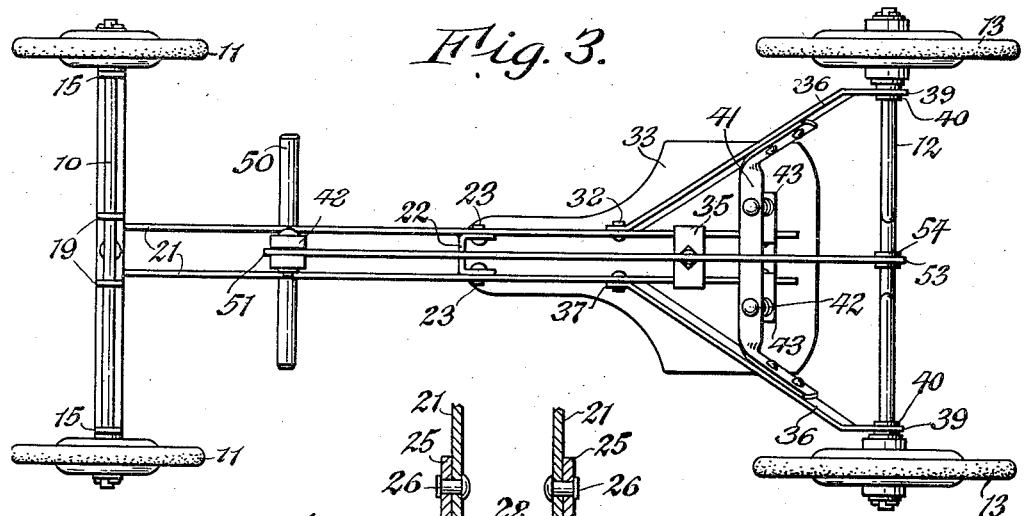
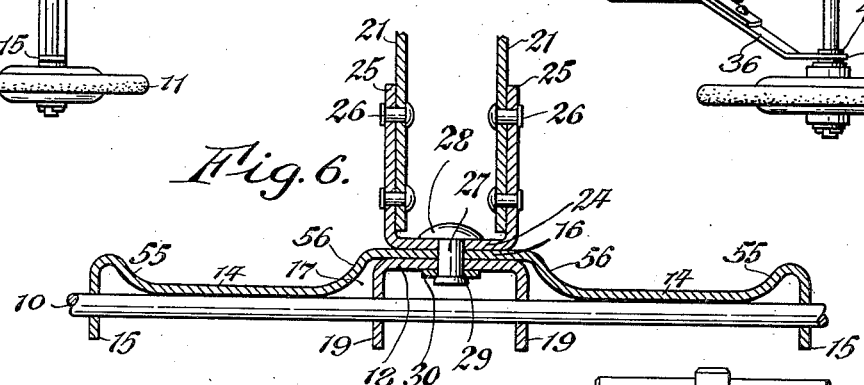
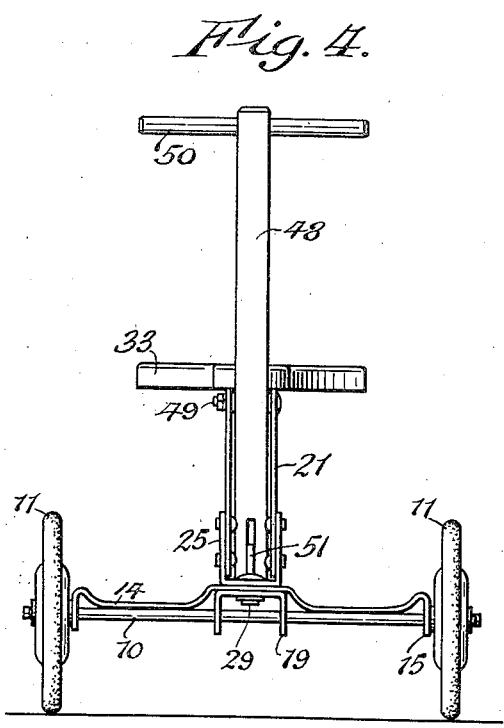
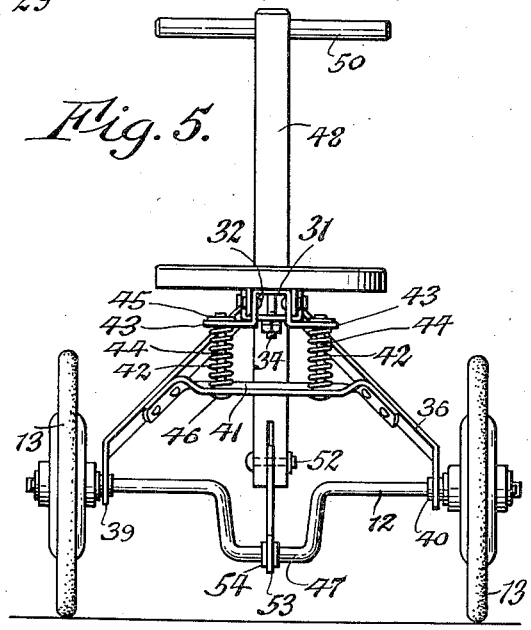
INVENTOR
Rudolph A. Klatt
BY
ATTORNEYS Patented Sept. 19, 1939

2,173,520

UNITED STATES PATENT OFFICE 2,173,520

JUVENILE CAR

Rudolph A. Klatt, Tonawanda, N. Y., assignor to Auto-Wheel Coaster Company, Inc., North Tonawanda, N. Y.

Application March 31, 1938, Serial No. 199,202

2 Claims. (Cl. 280—247)

This invention relates to a juvenile car and more particularly to a car of this character which is capable of being propelled by manual power and also has cushioning means for the purpose of avoiding shock to the child that is riding the car.

One of the objects of this invention is to provide an improved running gear for such cars which is of simple and inexpensive construction, yet strong and durable so as to withstand the rough usage to which the same may be subjected.

Another object of this invention is to provide improved means for cushioning the car and rendering its riding qualities more agreeable.

A further object of this invention is to provide an improved bolster for the front axle of the car and superior means for pivotally connecting this bolster with the front end of the reach and thereby not only strengthen the construction but also materially improve its appearance.

In the accompanying drawings:

Fig. 3 is a bottom plan view theerof.

Figs. 4 and 5 are front and rear elevations, respectively, of this car.

Fig. 6 is a fragmentary vertical cross section, on an enlarged scale, taken on line 6—6, Fig. 2.

In the following description similar characters of reference indicate like parts in the several figures of the drawings:

Figure 1:
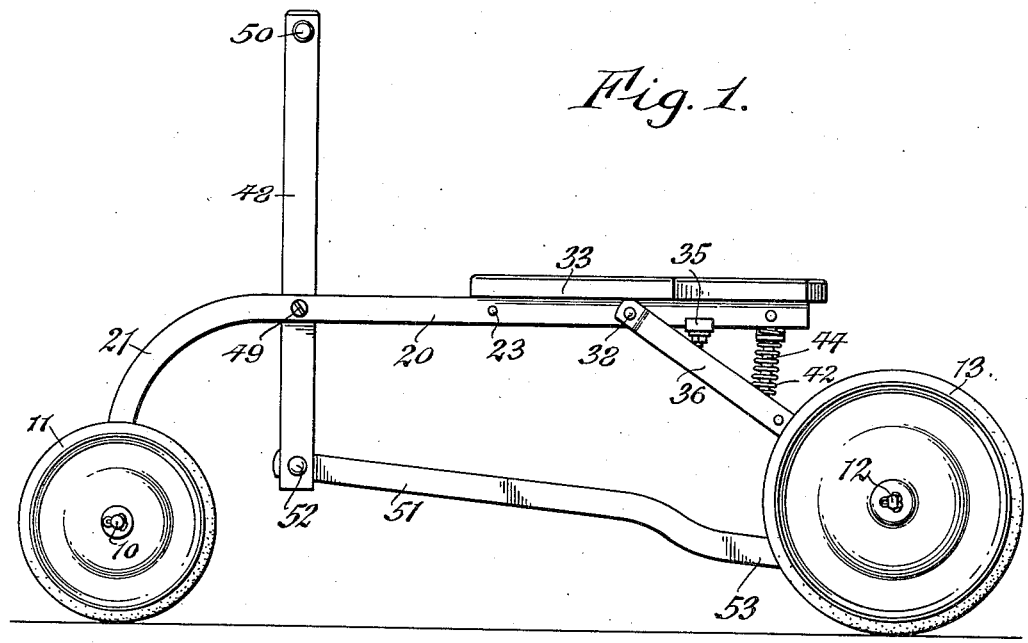
Fig. 1 is a side elevation of a juvenile car embodying these improvements.
Figure 2:
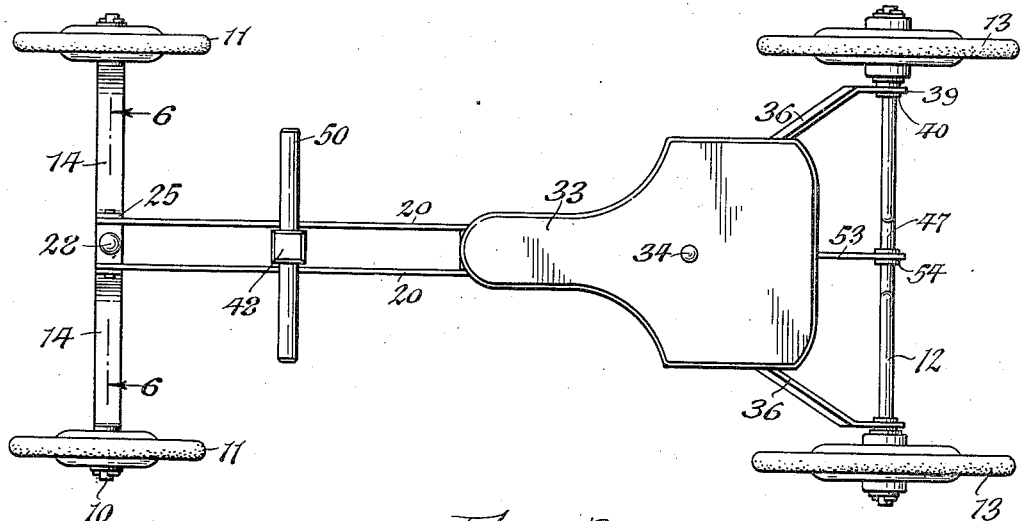
Fig. 2 is a top view of the same.

The numeral 10 represents the horizontal transverse front axle of the car which has front steering wheels 11 journaled on opposite ends thereof and adapted to run on the ground or floor, and the numeral 12 represents the horizontal transverse rear axle of the same which has secured to its opposite ends the rear or driving wheels 13.

Upon the front axle is mounted a bolster which is made in two sections of metal strips. One of these sections is bent to form two horizontal arms 14 arranged lengthwise above the front axle on opposite sides of its center and preferably resting on opposite end portions thereof, two attaching eyes 15 each of which is bent upwardly from the outer end of the respective arm 14 and then downwardly as shown at 55 in Figs. 4 and 6 and receives the adjacent part of the front axle, and a central bearing bar or plate 16 which connects the inner ends of the arms 14 and is elevated or offset upwardly therefrom so as to form a space 17 between this bar and the central part of the front axle, as shown in Figs. 4 and 5. The other section of the bolster consists of a horizontal transverse supporting bar 18 engaging with the underside of the bearing bar 16 and is provided at its opposite ends with downwardly bent attaching eyes 19 which receive the adjacent parts of the front axle.

The main frame of the car includes a reach which comprises two reach bars formed of metal strips of like construction which are arranged side by side lengthwise of the car but spaced apart transversely. Each of these reach bars consists of a horizontal rear part 20 and a front part 21 which curves forwardly and downwardly from the front end of the companion rear part 20 toward the upper side of the bolster. About midway of the length of the horizontal rear parts 20 of the reach bars, the same are connected by a metal bracket 22 of U-form which is interposed between the respective parts of the reach bars and secured thereto by means of rivets 23. The lower ends of the front curved parts of the reach bars are connected with each other by a U-shaped metal yoke the cross bar 24 of which rests on the bearing bar or plate 16 while the legs 25 of the same project upwardly from opposite ends of the cross bar 24 and are secured respectively to the outer sides of the front parts 21 of the reach bars by rivets 26, as best shown in Fig. 6. The front end of this reach and the bolster are pivotally connected with each other by means of a vertical king-bolt or pin 27 passing through corresponding openings in the cross bar 24 of the reach, the bearing bar 16 and supporting bar 18 of the bolster, said king-bolt having a head 28 which engages with the upper side of the yoke cross bar 24 while its lower end is upset or riveted, as shown at 29, and bears against a washer 30 which engages with the underside of the supporting bar 18. At their rear ends the horizontal rear parts 20 of the reach are rigidly connected with each other by means of a bracket 31 interposed between the same and connected therewith by means of rivets 32.

Upon the rear parts of the reach bar is mounted a seat 33 which is adapted to support the rider of the car, this seat being preferably constructed of wood and held in place on the reach by means of a bolt 34 passing through this seat and a transverse U-shaped clip 35 engaging with the underside of the reach bars and embracing the outer sides thereof, as best shown in Figs. 1 and 3.

The numeral 36 represents two hounds whereby the rear part of the reach is connected with the rear axle. These hounds are made of metal strips and incline downwardly and rearwardly from the reach and also diverge in this direction. At their front ends these hounds are provided with longitudinal pivot eyes 37 which engage with the outer sides of the horizontal parts 20 of the reach bars and are pivoted thereto by means of rivets 38 which are arranged horizontally and transversely in line with each other so that the two hounds can turn vertically relatively to the reach about the same axis. At their rear ends the hounds are provided with longitudinal bearing eyes 39 each of which is provided with a bearing sleeve 40 in which the adjacent end portion of the rear axle turns. About midway of the length of the two hounds the same are connected by means of a cross bar 41 the opposite ends of which are arranged at an angle corresponding to the angular position of the hounds and riveted to the latter so that the two hounds are rigidly connected and caused to move vertically in unison.

Cushioning means are provided for easing the shock on the party riding the car, which means may be variously constructed but preferably comprise two upright springs 42 arranged on opposite sides of the longitudinal center of the car and each bearing at its lower end against the hound cross bar 41 and engaging its upper end with a laterally projecting lug 43 formed on the bracket 31, as best shown in Figs. 1 and 5. Upon loading the seat 33 by the weight of the rider, the rear part of the reach is depressed thereby compressing the springs 42 and upon removing this weight the resilience of these springs causes the rear part of the reach to be again raised. The extent which the rear part of the reach is capable of being raised or separated from the rear parts of the hounds is limited by means of stay rods 44 each of which passes through one of the cushioning springs 42 and the adjacent parts of the hound bar 41 and the respective reach lug 43 and is provided at its upper and lower ends with stops 45, 46 which engage respectively with the upper side of the lug 43 and the underside of the hound bar 41, as shown in Fig. 5.

For the purpose of enabling the child to propel the car by manual power, the following means are provided:

The numeral 47 represents a crank formed on the rear axle by offsetting the central part of the same relatively to the end portions thereof, as shown in Fig. 5. Upon the front part of the axle is mounted an upright operating lever 48 which is arranged between the two reach bars and pivoted thereto by means of a horizontal transverse pivot bolt 49 so that the lower end or arm of this lever is below the reach and the upper end or arm thereof is above the reach, as shown in Figs. 1, 4 and 5. At its upper end this lever is provided with a handle or cross bar 50 which is within convenient reach of the occupant of the seat and permits this lever to be rocked back and forth in a vertical longitudinal plane by the rider of the car. This movement of the operating lever is transmitted to the rear axle of the car by a longitudinal connecting bar which has an elevated front part 51 pivotally connected at its front end by a bolt 52 with the lower end of the operating lever and a rear part 53 which is depressed out of line with the front part 51 of the connecting bar and has its rear end provided with a bearing sleeve 54 which receives the crank 47 of the rear axle. Upon manually rocking the lever 48 by means of the hands of the operator applied to the handle 50, this motion is transmitted by the connecting bar 51, 52 to the crank 47 of the rear axle, thereby rotating the rear driving wheels 13 of the car and causing the same to be propelled over the ground or floor on which the car rests.

Steering of the car while in motion is effected by the two feet of the child engaging with opposite arms 14 of the bolster, each foot of the rider at this time being limited in its crosswise movement on the bolster by an outer stop 55 which is formed by the rising portion of the bolster connecting the outer end of the respective arm 14 with the adjacent attaching eye 15 and an inner stop 56 which is formed by the rising portion of the arm 14 between the inner end of the same and the adjacent end of the elevated bearing bar 16, as shown in Fig. 6.

As a whole this car comprises comparatively few parts, all of which are of simple construction and capable of being produced at low cost. The several parts are also so organized that the car is strong and durable and capable of withstanding rough usage. The cushioning means are also very simple in construction and effeciently provide an easy ride, and by offsetting the front part 51 of the operating bar upwardly relative to the rear part 53 thereof, the liability of the car operating mechanism interfering with anything lying on the ground or floor over which the car travels is reduced to a minimum.

I claim as my invention:

1. A juvenile car comprising a front axle having wheels, a rear axle having wheels, a bolster on which the front axle is mounted, a reach composed of two laterally spaced longitudinal bars each of which has a horizontal rear part and a downwardly bent front part and a transverse bar connecting the front ends of the longitudinal bars and pivoted to the central part of said bolster, rearwardly diverging and inclined hounds pivoted at their elevated front ends to the rear parts of said reach bars and connected at their depressed rear ends with said rear axle, and means interposed between the rear parts of said reach bar and said hounds and including a cross bar connecting the diverging parts of said hounds, lugs arranged on the rear ends of said reach bars, springs interposed between said cross bar and said lugs, and stay rods slidingly connecting said cross bar and lugs.

2. A juvenile car comprising a front axle having wheels, a rear axle having wheels, a bolster comprising a metal strip forming two arms arranged above the end portions of said front axle, upwardly projecting outer stops connected at their inner ends with the outer ends of said arms, bearing eyes projecting downwardly from the outer ends of said stops and receiving the end portions of said front axle, an elevated upper bearing bar connecting the inner ends of said arms and forming inner stops, and a metal strip forming a lower supporting bar which engages with the underside of said upper bearing bar and two bearing eyes projecting downwardly from opposite ends of said supporting bar and receiving the central part of said front axle, and a reach connected at its front end with said bolster and at its rear end with the rear axle.

RUDOLPH A. KLATT.